United States Patent
Onishi et al.

(10) Patent No.: US 6,924,332 B2
(45) Date of Patent: Aug. 2, 2005

(54) FLAME RETARDED POLYAMIDE OR POLYESTER RESIN COMPOSITIONS

(75) Inventors: Hideaki Onishi, Otsu (JP); Makoto Teramoto, Kyoto (JP)

(73) Assignee: Dai-Ichi Kogyo Seiyaku Co., Ltd., Kyoto (JP)

(*) Notice: Subject to any disclaimer, the term of this patent is extended or adjusted under 35 U.S.C. 154(b) by 128 days.

(21) Appl. No.: 10/316,076

(22) Filed: Dec. 11, 2002

(65) Prior Publication Data

US 2003/0114567 A1 Jun. 19, 2003

(30) Foreign Application Priority Data

Dec. 11, 2001 (JP) ........................................ 2001-376659

(51) Int. Cl.$^7$ ............................ C08K 5/22; C08K 5/24
(52) U.S. Cl. ........................................ 524/189; 524/236
(58) Field of Search ................................ 524/189, 326, 524/236

(56) References Cited

U.S. PATENT DOCUMENTS 3,660,438 A * 5/1972 Dexter ........................ 554/54
4,469,834 A * 9/1984 Shearer et al. ............... 524/193
5,147,935 A * 9/1992 Volmer et al. ............... 524/152
5,216,054 A * 6/1993 Iwanami et al. ............. 524/120
5,846,478 A * 12/1998 Onishi et al. ................ 264/523
6,242,097 B1 * 6/2001 Nishiguchi et al. ......... 428/383

FOREIGN PATENT DOCUMENTS

JP 05-315117 * 11/1993

* cited by examiner

Primary Examiner—Peter Szekely
(74) Attorney, Agent, or Firm—Millen, White, Zelano & Branigan, P.C.

(57) ABSTRACT

A flame retarded polyamide or polyester resin composition is disclosed. The composition comprises (A) polyamide or polyester resin; (B) 3 to 50 parts by weight per 100 parts of said resin of brominated polystyrene or brominated polyphenylene ether; and (C) 10 to 10,000 ppm of said resin of a thermal coloration inhibitor selected from the group consisting of hydrazine, a hydrazino compound, a hydrazono compound and an acid addition salt thereof.

13 Claims, No Drawings

FLAME RETARDED POLYAMIDE OR POLYESTER RESIN COMPOSITIONS

FIELD OF THE INVENTION

This invention relates to a flame retarded polyamide or polyester resin composition for use in fabricating flame retarded articles such as automobile parts, electric and electronic parts, mechanical parts and the like.

BACKGROUND PRIOR ART

Polyamide resins represented by nylon 6 and nylon 66 and polyester resins represented by polyethylene terephthalate and polybutylene terephthalate have high mechanical, oil resistant, electrical insulating and other properties and are used in fabricating a variety of shaped articles such as automobile parts, electric and electronic parts, mechanical parts and the like while taking their advantage. When flame retardancy is required, a halogen-containing flame retardant is incorporated to the resin compound.

Unlike thermoplastics of versatile use represented by polystyrene, polyethylene and polypropylene, polyamide and polyester resins require a process temperature higher than 250° C. for dispersing the flame retardant in the resin compound owing to their high melting points. The flame retardant to be incorporated in polyamide or polyester resins should naturally remain stable during the processing at such a high temperature and, therefore, brominated polystyrene and brominated polyphenylene ether are usually used. However, the resins themselves often darken in brown during the processing with the flame retardant at such a high temperature, particularly in the presence of air or oxygen.

Some antioxidants such as hindered phenols, phosphorus- or sulfur-containing antioxidants are known to be effective to prevent oxidative deterioration of various resins. Such antioxidants are, however, effective to prevent spontaneous and slowly progressive oxidative deterioration of fabricated articles during a long term use thereof but not effective to satisfactorily prevent darkening of the resin during the processing with the flame retardant at a high temperature for relatively short period of time.

JP-A-02142852 discloses a flame retarded polyamide resin composition comprising polyamide resin, halogenated polystyrene or halogenated polyphenylene ether and hydrotalcite or a magnesium and aluminum-containing inorganic compound. JP-A-06345963 discloses a flame retarded polyamide composition comprising nylon 46 resin, brominated styrene homo- or copolymer, and hydrotalcite. It was found that hydrotalcite or other Mg and Al-containing inorganic compounds are not sufficiently effective to prevent darkening of polyamide resin in the presence of a flame retardant during the processing at higher temperatures and may have an adverse effect on the strength property of fabricated articles when used in a large amount. The foregoing problems are found also in polyester resins.

Accordingly, a need remains to exist for providing a flame retarded polyamide or polyester resin composition which is free from disadvantages of the prior art.

SUMMARY OF THE INVENTION

The present invention relates to a flame retarded thermoplastic resin composition comprising (A) a resin selected from the group consisting of polyamide and polyester, (B) 3 to 50 parts per 100 weight parts of said resin (A) of a flame retardant selected from the group consisting of brominated polystyrene and brominated polyphenylene ether, and (C) 10 to 10,000 ppm of said resin (A) of a thermal coloration inhibitor selected from the group consisting of hydrazine, a hydrazino compound, a hydrazono compound and an acid addition salt thereof.

The thermal coloration inhibitor used in the present invention acts as an agent for reducing oxidized products which cause coloration or darkening of the resin and/or as a self-sacrificing antioxidant by being oxidized itself. Thus it is very effective to prevent thermal coloration of the resin composition even in a small amount of addition and does not adversely affect mechanical and other beneficial properties of the resin. These advantages are not achieved by the use of hydrotalcite or conventional antioxidants used in the plastic and rubber industry.

DESCRIPTION OF PREFERRED EMBODIMENTS (A) Polyamide and Polyester Resins

The polyamide and polyester resins used in the present invention are those used in fabricating of rigid shaped articles such as molded articles. Examples of polyamide resins include nylon 6, nylon 66, nylon 11, nylon 12, nylon 46, nylon 6T, nylon 9T and blends thereof. Examples of polyester resins include polyethylene terephthalate, polybutylene terephthalate and copolyesters thereof. Also included in examples are polymer blends or alloys of polyamide and polyester.

(B) Flame Retardant

As stated before, polyamide and polyester resins require a process temperature higher than 250° C. for dispersing a flame retardant therein. The flame retardants usable for this purpose are, therefore, limited to one stable at such a high temperature and include brominated polystyrene and brominated poyphenylene ether. The term "brominated polystyrene" as used herein includes both homopolymer of dibromostyrene and post-brominated polystyrene preferably having a molecular weight from 3,000 to 100,000 and a bromine content greater than 50% by weight. Brominated polyphenylene ether preferably has a molecular weight from 1,000 to 20,000 and a bromine content greater than 55% by weight.

The flame retardant is incorporated in an amount from 3 to 50 parts by weight per 100 parts of resin (A). Since the flame retardant may affect the mechanical property of fabricated articles, the fewer the better within the above range provided that a desired level of flame retardancy is achieved.

(C) Thermal Coloration Inhibitor

Hydrazine and hydrazine derivatives are used in the organic synthesis as a reducing agent. The following compounds may be used in the present invention.

(i) Hydrazine Acid Addition Salts

Since hydrazine is dibasic, it forms a hydrazinium (1+) salt and a hydrozinium (2+) salt with an acid. Any inorganic or organic acid may be used to form the salt provided that a stable crystalline salt is formed. Examples of usable acids include inorganic acids such as hydrochloric, sulfuric, boric or carbonic acid, and organic acids such as p-toluenesulforic acid, benzoic acid or phenol. Sulfate, borate, p-toluenesulfonate and benzoate are preferable. Although crystalline hydrazine salts may be used, the addition of the hydrazine salt may be performed in a simple manner by wetting the flame retardant with an aqueous solution containing hydrazine and the acid in stoichiometric amounts and drying the wet product.

(ii) Hydrazino Compounds

The term "hydrozino compounds" as used herein refers to those compounds of the formula: R—NH—NH$_2$, wherein R is alkyl, aryl, aralkyl or pyridyl. Arylhydrazines such as phenylhydrazine or tolylhydrazine and an inorganic acid salt thereof such as the hydrochloride are preferable.

(iii) Hydrazono Compounds

The term "hydrazono compounds" as used herein refers to those compounds of the formula: (R)(R')N—NH$_2$, wherein R and R' are independently alkyl, aryl, aralkyl or pyridyl. Specific examples thereof include 1,1-diphenylhydrazine, 1-methyl-1-phenylhydrazine, 1-ethyl-1-phenylhydrazine, 1-butyl-1-phenylhydrazine, 1-methyl-1-(3-methylphenyl)hydrazine, 1-benzyl-1-phenylhydrazine, 1-benzyl-1-methylhydrazine and 1-methyl-1-(2-pyridyl)hydrazine. Also included in this class are those compounds in which R and R' are linked together with the nitrogen atom to form a ring. Examples of hydrazono compounds of the ring structure include 1-aminopyrrolidine and 1-aminoindoline. Salts with an inorganic or organic acid as mentioned above regarding hydrazine acid salts may also be employed.

The thermal coloration inhibitor can be an acid addition salt of hydrazine, arylhydrazine or an acid addition salt thereof, 1-alkyl-1-arylhydrazine or an acid addition salt thereof, 1-aralkyl-1-arylhydrazine or an acid addition salt thereof, 1-aralkyl-1-alkylhydrazine or an acid addition salt thereof, 1-alkyl-1-pyridylhydrazine or an acid addition salt thereof, 1,1-diarylhydrazine or an acid addition salt thereof, 1-aminopyrrolidine or an acid addition salt thereof, 1-aminoindoline or an acid addition salt thereof.

The thermal coloration inhibitor is used in an amount of 10 to 10,000 ppm relative to the resin (A), namely from 0.001 to 1.0 parts by weight per 100 parts of the resin. Since excessive addition does not bring about any additional effect and is not economical, an amount from 0.05 to 0.5 parts by weight per 100 parts of the resin is preferable.

(D) Auxiliary Flame Retardants

The flame retarded resin composition of the present invention may optionally contain an auxiliary flame retardant to enhance the flame retardancy. Examples thereof include antimony trioxide, antimony pentaoxide, sodium antimonate, tin oxide, tin hydroxide, zinc stannate, zinc hydroxystannate, molybdenum oxide, ammonium molybdate, zirconium oxide, zirconium hydroxide, zinc borate, zinc metaborate and barium metaborate. Antimony trioxide and sodium antimonate are preferred.

(E) Other Additives

The flame retarded resin composition of the present invention may optionally comprise a variety of other conventional additives provided that they do not adversely affect the flame retardancy. Non-limiting examples thereof include antioxidants such as hindered phenol or phosphite ester antioxidants, heat stabilizers such as bisphenol A diglycidyl ether, UV absorbers such as benzotriazole derivatives, UV stabilizers such as benzoate and hindered amine derivatives, impact strength enhancers such as glass fiber or carbon fiber, pigments such as titanium dioxide or carbon black, fillers such as talc or aerosil, lubricants or anti-dripping agents such as silicone or fluorocarbon resins, anti-static agents such as nonionic surfactant type, blowing agents such as azo dicarboxamide, sodium carbonate or N-alkylbenzenesulfonamide, plasticizers and co-solubilizing agents.

If necessary, a flame retardant other than brominated polystyrene and brominated polyphenylene ether (B) may also be incorporated in conjunction with the flame retardant (B) to impart the desired flame retardancy level to polyamide and polyester resins (A). Flame retardants of this class are commercially available and include, for example, decabromodiphenyl oxide, octabromodiphenyl oxide, tetrabromodiphenyl oxide, bis(pentabromophenyl)ethane, bis(2,4,6-tribromophenoxy)ethane, ethylenebis(tetrabromophthalimide), hexabromobenzene, pentabromotoluene, tris(2,3-dibromopropyl)isocyanurate, tribromophenol, tribromophenyl allyl ether, tribromoneopentyl alcohol, tetrabromobisphenol A epoxy oligomer, tetrabromobisphenol A bis(2,3-dibromopropyl)ether, tris(2,4,6-tribromophenoxy)triazine, tetrabromobisphenol A carbonate oligomer, tetrabromo-bisphenol A bis(2-hydroxyethyl) ether, tetrabromobisphenol A diallyl ether, octabromotrimethylphenylindane, poly(pentabromobenzyl acrylate), brominated polyethylene and perchlorocyclopentadecane. Halogen-containing phosphate esters such as tris(2,3-dibromopropyl)phosphate, tris(2,3-bromochloropropyl)phosphate, tris(tribromoneopentyl)phosphate and bis(2,3-dibromopropyl)2,3-dichloropropyl phosphate may also employed. Halogen-free phosphate esters of condensation type may also employed. Examples thereof include resorcinol bis(diphenylphosphate), bisphenol A bis(diphenylphosphate), resorcinol bis(dicresylphosphate), bisphenol A bis(dicresylphosphate) and resorcinol bis(di-2,6-xylenylphosphate).

The amount of auxiliary flame retardant (D) may be determined in terms of its ratio to the essential flame retardant (B) and preferably lies from 0.1 to 1.0 times by weight relative to the flame retardant (B). The amounts of optional additives are not critial unless the performance of the resulting composition such as flame retardancy, mechanical strength and coloration-preventive effect is compromised.

The flame retarded resin composition of the present invention may be produced by the conventional process by mixing various additives with the resin (A) and kneading the mixture under heat to obtain a homogenous compound using a mil such as twin screw extruders, Bunbary mixer, laboratory plastic mills or hot rolls. Various ingredients may be mixed in any order. In order to achieve a uniform dispersion of a small amount of coloration inhibitor (C), it is preferable to uniformly mix the inhibitor (C) with the flame retardant (B) firstly to produce a premix, and then blend the premix with resin (A) and other additives. The resin compound may be shaped to a desired article by injection molding, hot pressing and other conventional methods.

EXAMPLES

The following examples are intended to further illustrate the present invention without limiting thereto. All parts and percents therein are by weight unless otherwise indicated.

Examples 1–12 and Comparative Examples 1–6

I. Materials

The following materials are used in Examples and Comparative Examples.

(A) Resin

A#1: Nylon 66 available from Asahi Kasei Corp. under the name of REONA 1300S.

A#2: Nylon 6 available from Ube Industries, Ltd. under the name of UBE Nylon 1013B.

A#3: Polyethylene teraphthalate available from Mitsubishi Rayon Co., Ltd. under the name of DIANITE PA-200.

A#4: Polybutylene teraphthalate available from Mitsubishi Rayon Co., Ltd. under the name of TAFPET PBT N1000.

(B) Flame Retardant

B#1: Brominated polystyrene available from Albemarle uner the name of PYROCHEK 68PBC.

B#2: Brominated polyphenylene ether available from Dai-Ichi Kogyo Seiyaku Co., Ltd. under the name of PYROGUARD SR-460B.

(C) Thermal Coloration Inhibitor

C#1: Hydrazine sulfate. An aqueous solution of hydrazine was neutralized with sulfuric acid at pH 4–5. This solution was uniformly mixed with the above flame retardant (B) followed by drying.

C#2: Hydrazine borate. An aqueous solution containing hydrazine and boric acid at 1:1 molar ratio was uniformly mixed with the above flame retardant (B) followed by drying.

C#3: 1,1-Diphenylhydrazine(reagent grade).

C#4: 1-aminoindoline(reagent grade).

(D) Auxiliary Flame Retardant

D#1: Antimony trioxide available from Dai-Ichi Kogyo Seiyaku Co., Ltd. under the name of PYROGUARD AN-800(T).

(E) Other Additives

E#1: Glass fiber

E#2: Hindered phenol antioxidant available from Ciba Specialty Chemicals under the name of IRGANOX 1010.

E#3: Calcium stearate (heat stabilizer).

E#4: Hydrotalcite available from Kyowa Chemical Industry Co., Ltd. under the name of DHT-4A.

II. Test Method

1. Fabrication of Specimens

According to the formulations shown in Tables 1 and 2, materials in the described amounts (weight parts) were kneaded in a laboratory plastic mill at 280° C. for 5 minutes and then molded into a sheet by compressing the resin compound at 280° C. for 3 minutes. Specimens were cut out the sheet in a predetermined size.

2. Flame Retardancy Test

The vertical flaming test according to UL-94 standard was followed using a specimen having 125 mm length, 12.5 mm width and 1.6 mm thickness.

3. Anti-Thermal Coloration Test

A specimen of 3 cm×3 cm size was heated at 300° C. for 5 minutes in a hot press and the color difference Δ E before and after the heating was measured using a color difference meter.

4. Flexural Modulus of Elasticity and Flexural Strength ASTM-D790 Standard was Followed.

The test results are also shown in Tables 1 and 2.

TABLE 1

| Material (parts by weight) | EXAMPLE | | | | | |
|---|---|---|---|---|---|---|
| | 1 | 2 | 3 | 4 | 5 | 6 |
| A#1 | 100 | — | — | — | 100 | 100 |
| A#2 | — | 100 | — | — | — | — |
| A#3 | — | — | 100 | — | — | — |
| A#4 | — | — | — | 100 | — | — |
| B#1 | — | — | — | — | — | 25 |
| B#2 | 23 | 23 | 20 | 20 | 23 | — |
| C#1 | 0.1 | 0.1 | 0.1 | 0.1 | 0.005 | 0.2 |
| C#2 | — | — | — | — | — | — |
| C#3 | — | — | — | — | — | — |
| C#4 | — | — | — | — | — | — |
| D#1 | 9 | 9 | 7 | 7 | 9 | 12 |
| E#1 | 25 | 25 | 30 | 30 | 25 | 25 |
| E#2 | 0.4 | 0.4 | 0.4 | 0.4 | 0.4 | 0.4 |
| E#3 | 0.2 | 0.2 | 0.2 | 0.2 | 0.2 | 0.2 |
| UL-94 | V-0 | V-0 | V-0 | V-0 | V-0 | V-0 |
| Anti-thermal Coloration, ΔE | 0.8 | 1.2 | 1.2 | 0.5 | 2.4 | 0.6 |
| Flex. Modulus (MPa) | 11000 | 7600 | 9300 | 10900 | 11400 | 10100 |
| Flex. Strength (MPa) | 246 | 248 | 209 | 174 | 250 | 229 |

| Material (parts by weight) | EXAMPLE | | | | | |
|---|---|---|---|---|---|---|
| | 7 | 8 | 9 | 10 | 11 | 12 |
| A#1 | 100 | 100 | 100 | 100 | 100 | 100 |
| A#2 | — | — | — | — | — | — |
| A#3 | — | — | — | — | — | — |
| A#4 | — | — | — | — | — | — |
| B#1 | — | — | — | — | — | — |
| B#2 | 23 | 23 | 23 | 10 | 23 | 23 |
| C#1 | — | — | — | 0.05 | 0.9 | 0.1 |
| C#2 | 0.2 | — | — | — | — | — |
| C#3 | — | 0.3 | — | — | — | 0.1 |
| C#4 | — | — | 0.3 | — | — | — |
| D#1 | 9 | 9 | 9 | 7 | 9 | 9 |
| E#1 | 25 | 25 | 25 | — | 25 | 25 |
| E#2 | 0.4 | 0.4 | 0.4 | 0.4 | 0.4 | 0.4 |
| E#3 | 0.2 | 0.2 | 0.2 | 0.2 | 0.2 | 0.2 |
| UL-94 | V-0 | V-0 | V-0 | V-1 | V-0 | V-0 |
| Anti-thermal coloration, ΔE | 0.7 | 2.1 | 2.5 | 0.6 | 0.7 | 1.0 |
| Flex, Modulus (MPa) | 10900 | 11200 | 10200 | 12000 | 10500 | 11100 |
| Flex, Strength (MPa) | 243 | 245 | 233 | 260 | 225 | 240 |

TABLE 2

| Material (parts by weight) | COMPARATIVE EXAMPLES | | | | | |
|---|---|---|---|---|---|---|
| | 1 | 2 | 3 | 4 | 5 | 6 |
| A#1 | 100 | — | — | — | 100 | 100 |
| A#2 | — | 100 | — | — | — | — |
| A#3 | — | — | 100 | — | — | — |
| A#4 | — | — | — | 100 | — | — |
| B#1 | — | — | — | — | 25 | — |
| B#2 | 23 | 23 | 20 | 20 | — | 23 |
| D#1 | 9 | 9 | 7 | 7 | 12 | 9 |
| E#1 | 25 | 25 | 30 | 30 | 25 | 25 |
| E#2 | 0.4 | 0.4 | 0.4 | 0.4 | 0.4 | 0.4 |
| E#3 | 0.2 | 0.2 | 0.2 | 0.2 | 0.2 | 0.2 |
| E#4 | — | — | — | — | — | 0.3 |
| UL-94 | V-0 | V-0 | V-0 | V-0 | V-1 | V-0 |
| Anti-thermal coloration, ΔE | 12.2 | 13.7 | 15.8 | 10.9 | 9.9 | 5.2 |
| Flex. Modulus (MPa) | 11300 | 8000 | 9500 | 11500 | 10300 | 8200 |
| Flex. Strength (MPa) | 264 | 239 | 222 | 173 | 221 | 202 |

Comparative Examples 1–4 correspond to Examples 1–4, respectively except that the thermal coloration inhibitor (C) is dispensed with. Comparative Example 1 also corresponds to Examples 5, 6–9 and 11–12 except that the thermal coloration inhibitor is dispensed with. When comparison is made between the above Examples and the corresponding Comparative Examples, it is evident that the thermal coloration inhibitor (C) used in the present invention can prevent the thermal coloration of flame retarded polyamide or polyester resin composition even in a small amount of addition without adversely affecting other performance of the composition. Comparative Example 6 contains hydrotalcite instead of the thermal coloration inhibitor (C) of the present invention. When comparing to Comparative Example 6, Examples 8, 9 and 12 containing inhibitor (C) all exhibit superior coloration-preventing effect to Comparative Example 6.

What is claimed is:

1. A flame retarded thermoplastic resin composition comprising:

(A) a thermoplastic resin selected from the group consisting of polyamide and polyester;

(B) 3 to 50 parts by weight per 100 parts of resin (A), a flame retardant selected from the group consisting of brominated polystyrene and brominated polyphenylene ether; and (C) 10 to 10,000 ppm of said resin (A), a thermal coloration inhibitor selected from the group consisting of hydrazine, a hydrazino compound, a hydrazono compound and their acid addition salts thereof.

2. The composition according to claim 1 wherein the thermal coloration inhibitor is an acid addition salt of hydrazine, arylhydrazine or an acid addition salt thereof, 1-alkyl-1-arylhydrazine or an acid addition salt thereof, 1-aralkyl-1-alkylhydrazine or an acid addition salt thereof, 1-aralkyl-1-arylhydrazine or an acid addition thereof, 1-alkyl-1-pyridylhydrazine or an acid addition thereof, 1,1-diarylhydrazine or an acid addition salt thereof, 1-aminopyrrolidine or an acid addition salt thereof, or 1-aminoindoline or an acid addition salt thereof.

3. A flame retarded thermoplastic resin composition comprising:

(A) a thermoplastic resin selected from the group consisting of polyamide and polyester;

(B) 3 to 50 parts by weight per 100 parts of resin (A), a flame retardant selected from the group consisting of brominated polystyrene and brominated polyphenylene ether; and (C) 10 to 10,000 ppm of resin (A), a thermal coloration inhibitor which is an acid addition salt of hydrazine, arylhydrazine or an acid addition salt thereof, 1-alkyl-1-arylhydrazine or an acid addition salt thereof, 1-aralkyl-1-1-arylhydrazine or an acid addition salt thereof, 1-aralkyl-1-1-alkylhydrazine or an acid addition salt thereof, 1-alkyl-1-pyridylhydrazine or an acid addition thereof, 1,1-diarylhydrazine or an acid addition salt thereof, 1-aminopyrrolidine or an acid addition salt thereof or 1-aminoindoline or an acid addition salt thereof, wherein the acid addition salt, in each case independently, is hydrochloride, sulfate, borate, carbonate, p-toluenesulfonate, benzoate or phenolate.

4. The composition according to claim 1 wherein the polyamide resin is nylon 6, nylon 66, nylon 11, nylon 12, nylon 46, nylon 6T, nylon 9T or a polymer blend thereof.

5. The composition according to claim 1 wherein said polyester resin is polyethylene terephthalate, polybutylene terephthalate or copolyester thereof.

6. The composition according to claim 1 wherein said brominated polystyrene is stable at temperature higher than 250° C. and has a bromine content greater than 50% by weight.

7. The composition according to claim 1 wherein said brominated polyphenylene ether is stable at temperature higher than 250° C. and has a bromine content greater than 55% by weight.

8. The composition according to claim 1 further comprising 0.1 to 1.0 times by weight of he flame retardant (B), an auxiliary flame retardant selected from the group consisting of antimony trioxide, antimony pentaoxide, sodium antimonate, tin oxide, tin hydroxide, zinc stannate, zinc hydroxystannate, molybdenum oxide, ammonium molybdate, zirconium oxide, zirconium hydroxide, zinc borate, zinc metaborate and barium metaborate.

9. The composition according to claim 8 wherein the auxiliary flame retardant is antimony trioxide.

10. The composition according to claim 1 wherein the thermal coloration inhibitor is a hydrazine acid addition salt, or a hydrazino compound or a hydrazono compound or an acid addition salt of a hydrazino compound or a hydrazono compound.

11. The composition according to claim 1 wherein the thermal coloration inhibitor is an acid addition salt of $NH_2—NH_2$.

12. The composition according to claim 1 wherein the thermal coloration inhibitor is a compound of formula $R—NH—NH_2$, wherein R is alkyl, aryl, aralkyl or pyridyl, or an acid addition salt thereof.

13. The composition according to claim 1 wherein the thermal coloration inhibitor is a compound of formula $(R)(R')N—NH_2$, wherein R and R' are each independently alkyl, aryl, aralkyl or pyridyl, or an acid addition salt thereof.

* * * * *

UNITED STATES PATENT AND TRADEMARK OFFICE
CERTIFICATE OF CORRECTION

PATENT NO. : 6,924,332 B2
DATED : August 2, 2005
INVENTOR(S) : Hideaki Onishi et al.

It is certified that error appears in the above-identified patent and that said Letters Patent is hereby corrected as shown below:

Column 7,
Line 40, reads "addition thereof" should read -- addition salt thereof --.

Column 8,
Lines 2 and 4, read "1 aralkyl-1-1-" should read -- 1 aralkyl-1- --.

Signed and Sealed this

Twenty-second Day of November, 2005

JON W. DUDAS
*Director of the United States Patent and Trademark Office*